United States Patent
Balajadia

(10) Patent No.: US 6,394,478 B1
(45) Date of Patent: *May 28, 2002

(54) BICYCLE FRAME

(76) Inventor: Jose P. Balajadia, 61-51 98 St., Apt. 3J, Rego Park, NY (US) 11374

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/677,273

(22) Filed: Oct. 2, 2000

(51) Int. Cl.[7] ................................................. B62M 1/02
(52) U.S. Cl. ..................... 280/281.1; 280/288; 280/261
(58) Field of Search ............................. 280/274, 281.1, 280/288, 267, 268, 269, 259, 260, 261

(56) References Cited

U.S. PATENT DOCUMENTS

| 593,363 A | * 11/1897 | Moe |
| 595,490 A | * 12/1897 | Montgomery |
| 1,154,292 A | 9/1915 | Cribbs |
| 1,360,032 A | 11/1920 | Schiffner |
| 1,535,714 A | 4/1925 | Burke |
| 2,062,829 A | * 12/1936 | Sabaeff |
| 5,078,416 A | * 1/1992 | Keyes ........................ 280/260 |

FOREIGN PATENT DOCUMENTS

DE         3830961 A1 * 3/1990

* cited by examiner

Primary Examiner—Kevin Hurley

(57) ABSTRACT

The improved bicycle frame is designed for adult bicycles. It is made of single tubes only. The chainstay and the seatstay are of slightly larger diameters than the neck tube, top tube, down tube, and seat tube. This is so because more than half of the load is carried in the rear part of the bicycle. Therefore, the chainstay and the seatstay are the stronger members of the frame. The fork for the rear wheel is attached at an angle of 45° in order to reduce the vertical component of the load at the rear. The improved bicycle frame is designed to have small wheels only. The wheels are less than half the diameters of the big wheels in use today. The small wheels reduce the effort needed to push the pedals. The improved bicycle frame is strong, sturdy, and stable. The bicycle using the improved bicycle frame is a quality bicycle.

3 Claims, 10 Drawing Sheets

BICYCLE FRAME

CROSS REFERENCE TO RELATED APPLICATION Ser. No.

09/451/011-Nov. 29, 1999.

STATEMENT REGARDING FEDERALLY SPONSORED RESEARCH OR DEVELOPMENT

Not Applicable.

REFERENCE TO A "MICROFICHE APPENDIX"

Not Applicable.

BACKGROUND OF THE INVENTION (1) Field of the Invention

This invention relates to adult bicycles using small wheels only specifically to an improved bicycle frame having single tube chainstay and seatstay that are not attached to the rear wheel axle.

(2) Description of the Related Art

Generally, bicycles for adults have big wheels. The chainstay and the seatstay are both made of smaller tubes than the rest of the frame, forming a fork to accommodate the rear wheel, and the drop tips attached to the rear wheel axle. Both chainstay and seatstay are considered as the weakest part of the frame. The chainstay is positioned in an almost horizontal position so that almost all of the vertical component of the load is being supported by the rear wheel. The big wheels are difficult to turn. These two factors make it difficult to push the pedal.

Bicycles for adults may be classified into 3 types depending on how many gears are there in the transmission system. They are: Type 1 has only two gears, the chainwheel and the rear wheel gear. The chainwheel is the large gear while the rear wheel gear is the small gear. A chain connects the two together. This large/small gear combination makes the rear wheel turn faster. If there are multiple gears at the rear wheel, only the smallest counts because the other gears which are larger slow down the rotation of the wheel. Type 2 has the basic chainwheel and small rear wheel gear plus an additional shaft attached with a small/large gear combination, is interposed between the chainwheel and the rear wheel gear. Two chains interconnect all the gears. The first chain connects the chainwheel to the small gear of the added gear combination, while a second chain connects the large gear to the rear wheel gear. Type 3 has the basic chainwheel and rear wheel gear plus an additional two shafts each with a small/large gear combination, interposed between the chainwheel and the rear wheel gear. Three separate chains interconnect all the gears. A first chain connects the chainwheel to the first small gear of the first added gear combination, a second chain connects the first large gear added, to the second small gear of the added combination, and a third chain connects the second large gear added in the combination, to the rear wheel gear.

Some examples of the type 2 bicycles are: U.S. Pat. No. 1,154,292-Sep. 19, 1915 Cribbs; U.S. Pat. No. 1,360,032-Nov. 19, 1920 Schiffner; U.S. Pat. No. 1,535,714-Apr. 19, 1925 Burke. An example of a type 3 bicycle is U.S. Pat. No. 5,913,741-Jun. 22, 1999 Balajadia.

Another relevant prior art is application 09/451/011 filed on Nov. 29, 1999, entitled Rear Wheel Assembly. The purpose of the invention is to lighten pedal pushing of bicycles. It utilizes 3 principles in order to achieve this. First is the use of more than one wheel in order to distribute the load carried by the wheels; second, slanting the fork of the wheels at 45° in order to reduce the vertical component of the load, and third, using small size wheels only in order to reduce the resistance of the wheel to rotate. Utilizing one or more of these principles will help lessen the effort needed to push the pedals.

BRIEF SUMMARY OF THE INVENTION

The improved bicycle frame is made with single tubes only, resulting in a stronger, sturdier, and more stable structure. It is designed for adult bicycles using small wheels only, i.e. diameters of less than half of the big wheels in use today. A bicycle with the improved frame is lighter to pedal.

DETAILED DESCRIPTION OF THE INVENTION

Figure 1:
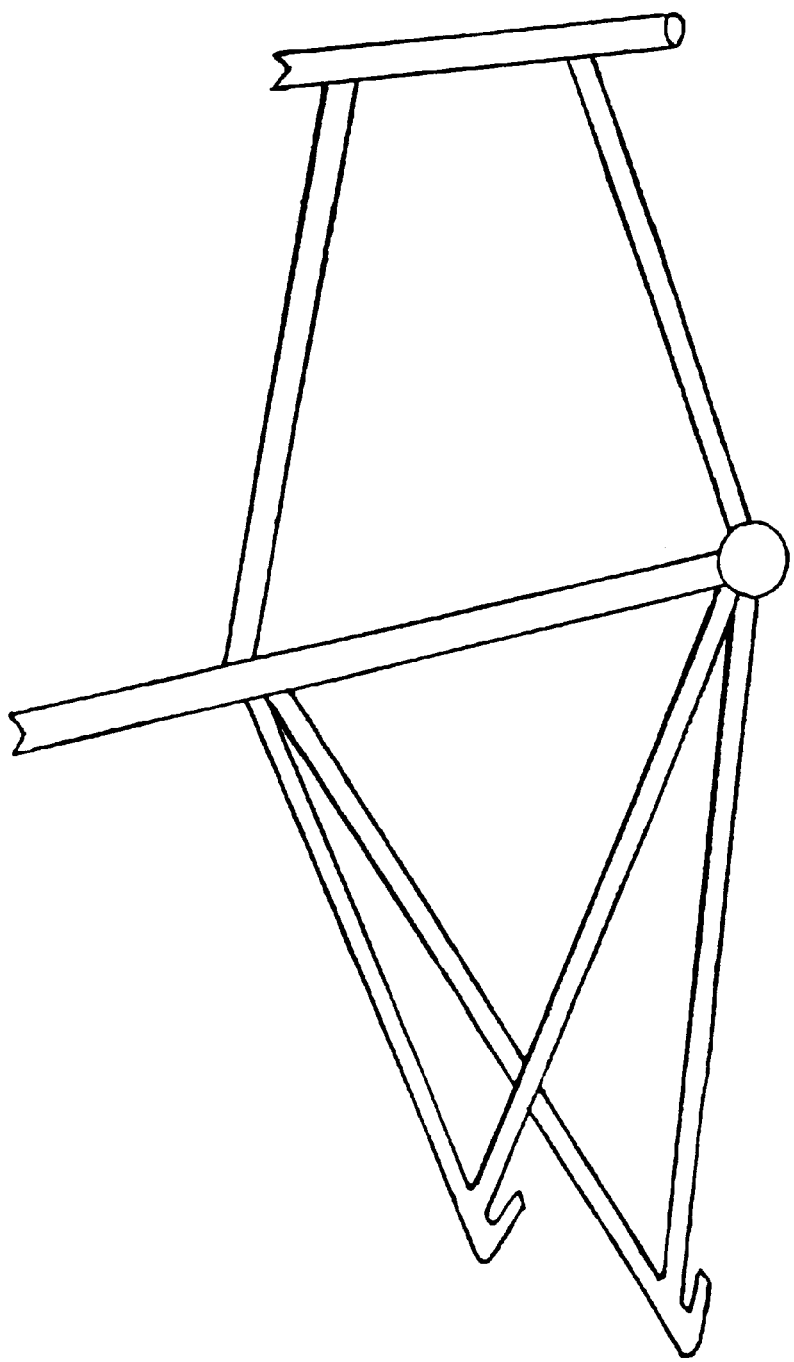
FIG. 1 is a perspective of a bicycle frame, a prior art.
Figure 2:
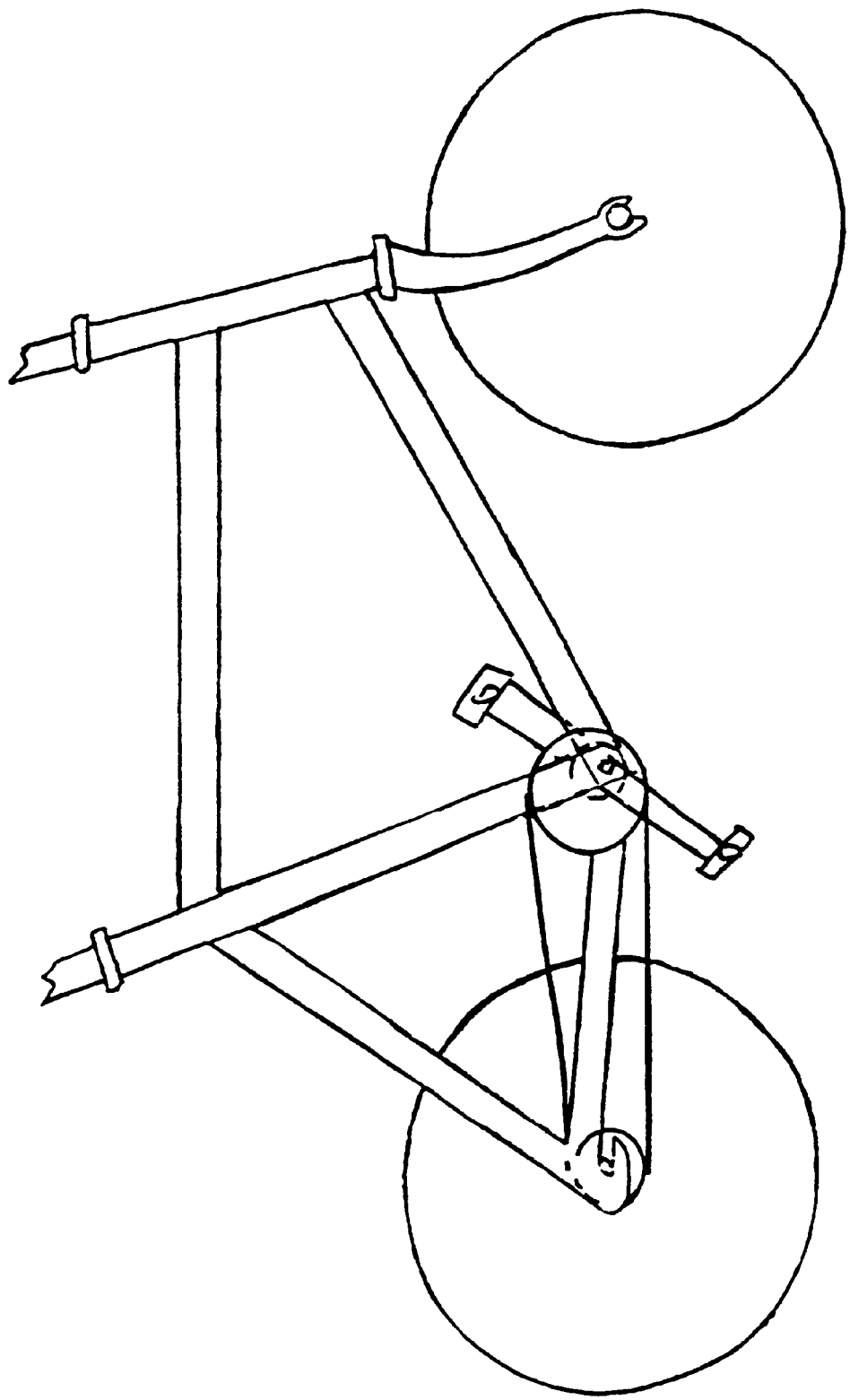
FIG. 2 is a side elevation of a type 1 bicycle, a prior art.
Figure 3:
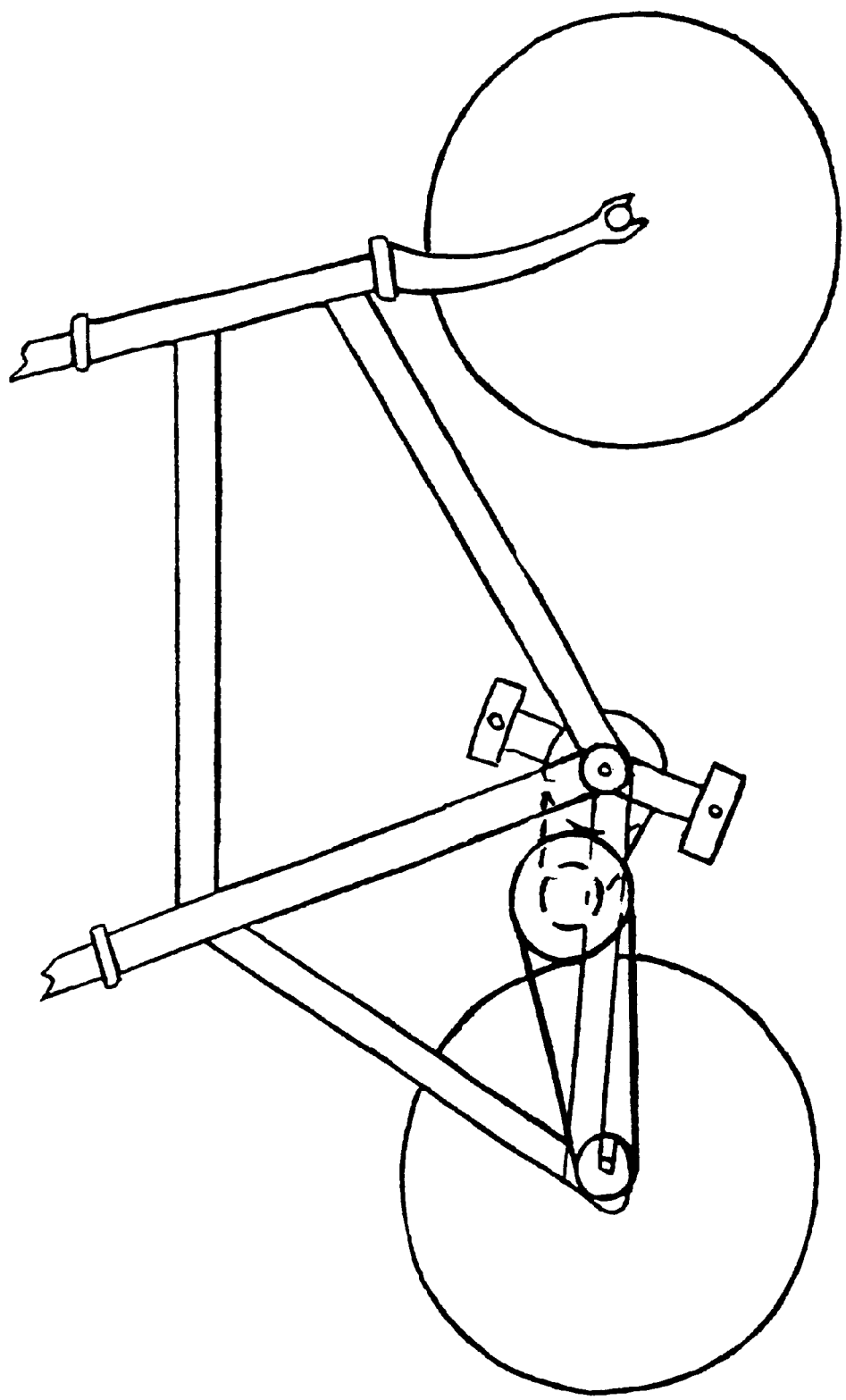
FIG. 3 is a side elevation of a type 2 bicycle, a prior art.
Figure 4:
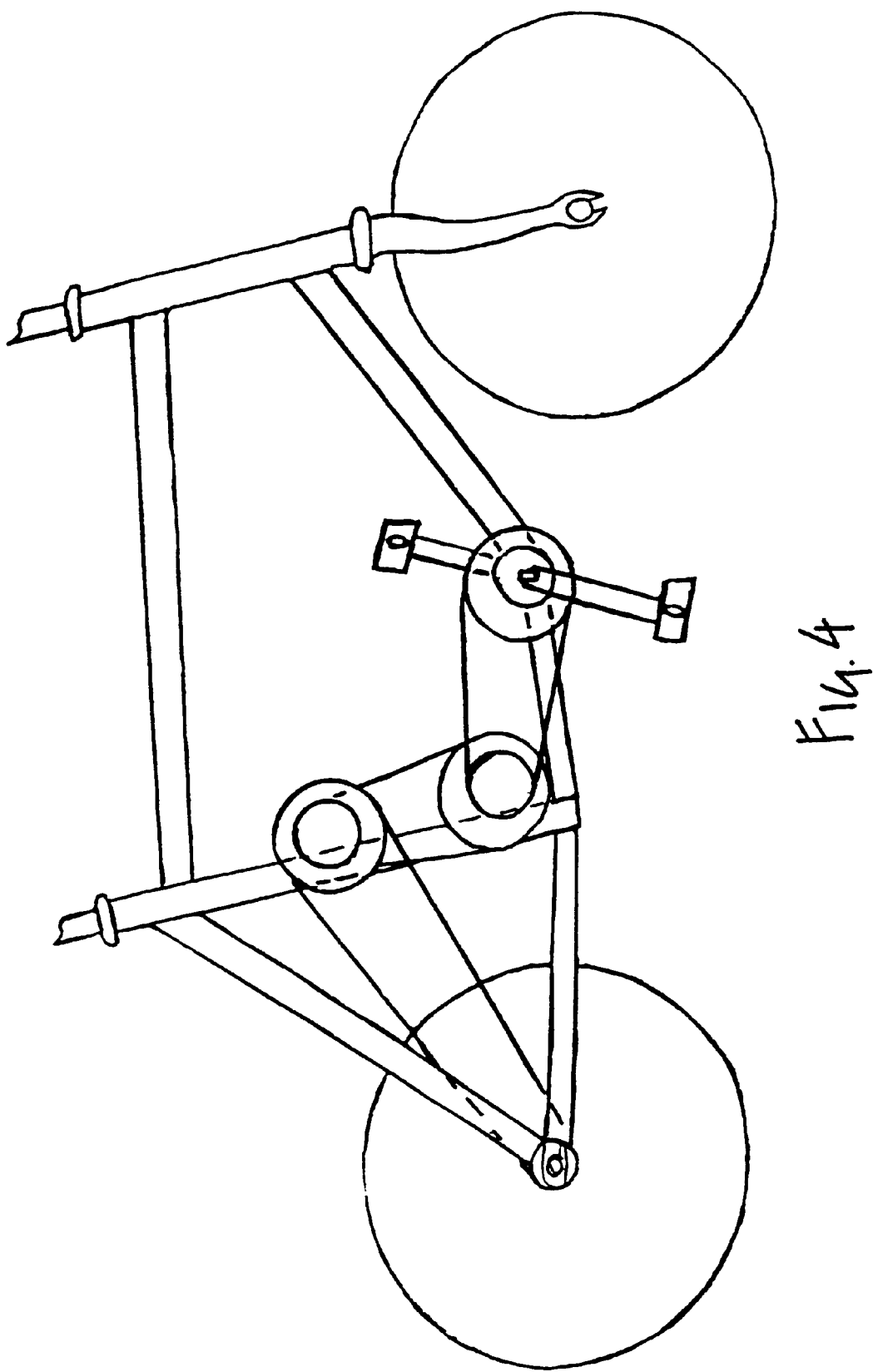
FIG. 4 is a side elevation of a type 3 bicycle, a prior art.
Figure 5:
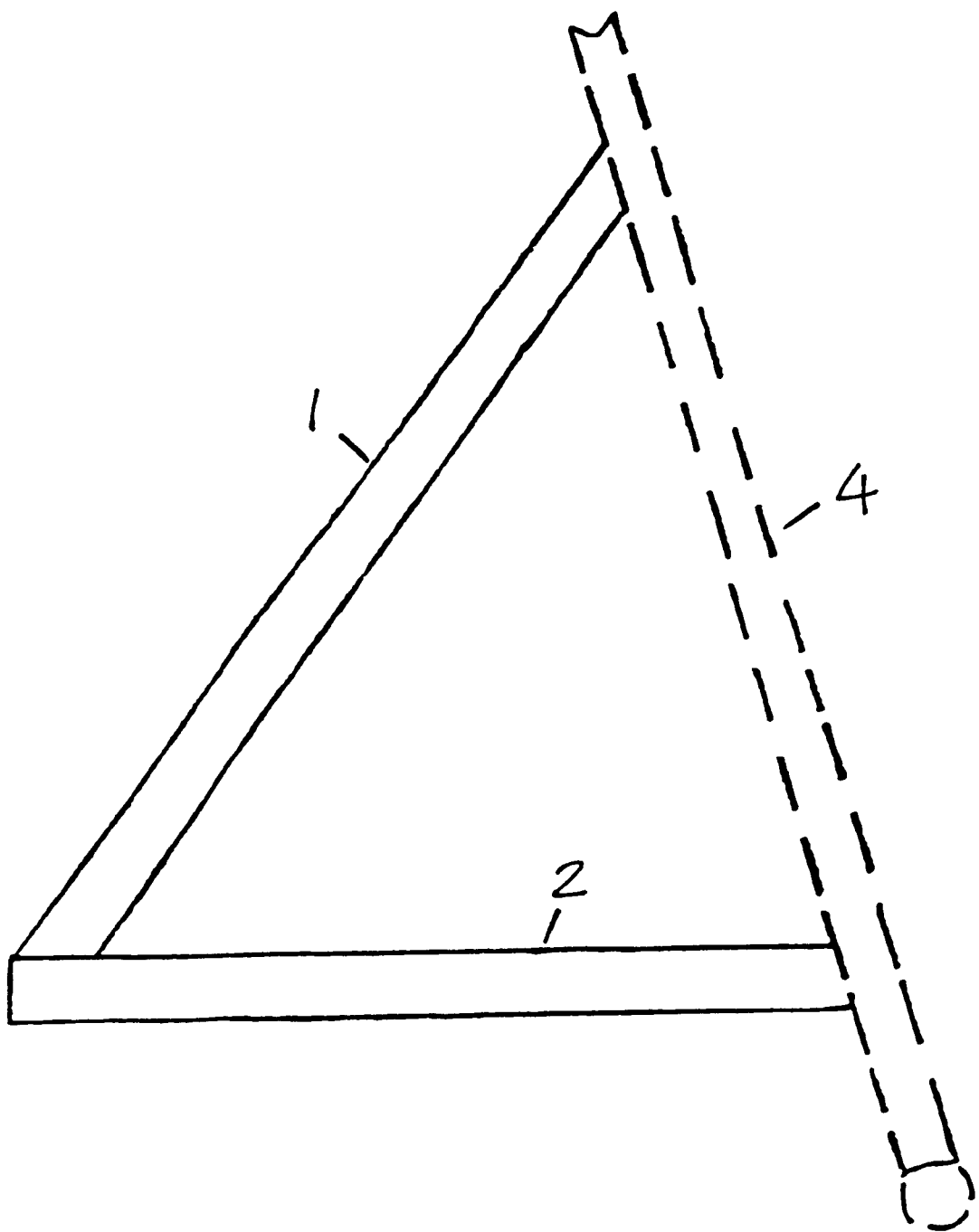
FIG. 5 is a detail of the seatstay and the chainstay.
Figure 6:
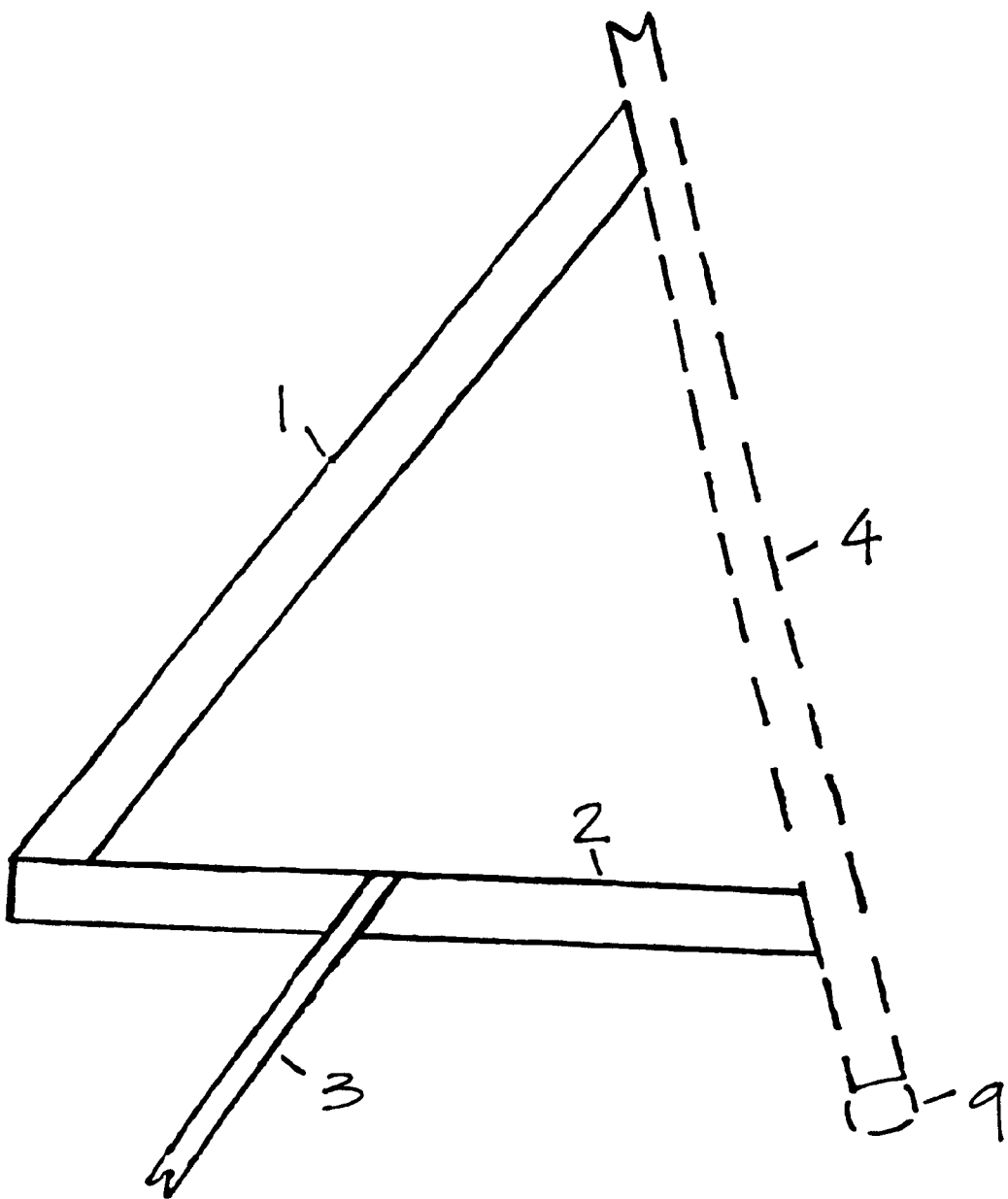
FIG. 6 is a detail of the seatstay and the chainstay with a rear wheel fork attached at the chainstay.

The improved bicycle frame has two main differences with the regular bicycle frame. Firstly, the improved bicycle frame has single tubes for the seatstay and the chainstay. They are slightly larger in diameter than the seat tube, top tube, down tube, and the neck tube. The chainstay (2) has one end attached at the back of the seat tube (4) at the lower part. The seatstay (1) has one end attached at the back of the seat tube (4) at the upper part. The unattached end of the chainstay (2) and the unattached end of the seatstay (1) are welded together. The chainstay (2), the seatstay (1), and the seat tube (4) form a triangle, making a strong, sturdy, and stable structure, FIG. 5. Secondly, a fork (3) for the rear wheel is attached at the chainstay (2), FIG. 6.

Figure 7:
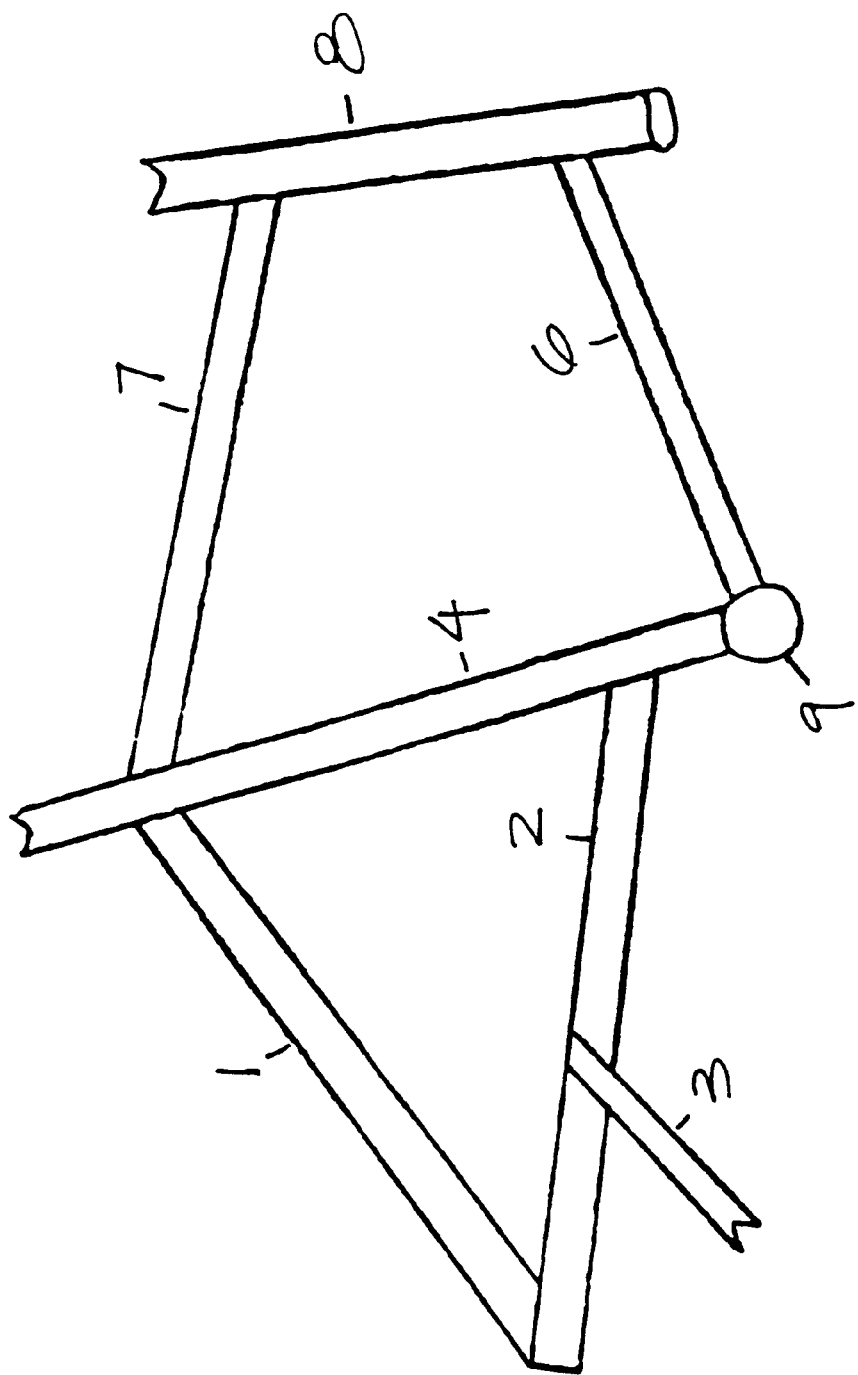
FIG. 7 is a perspective of an improved bicycle frame.

FIG. 7 is a perspective of the improved bicycle frame complete with all members of the frame.

Figure 8:
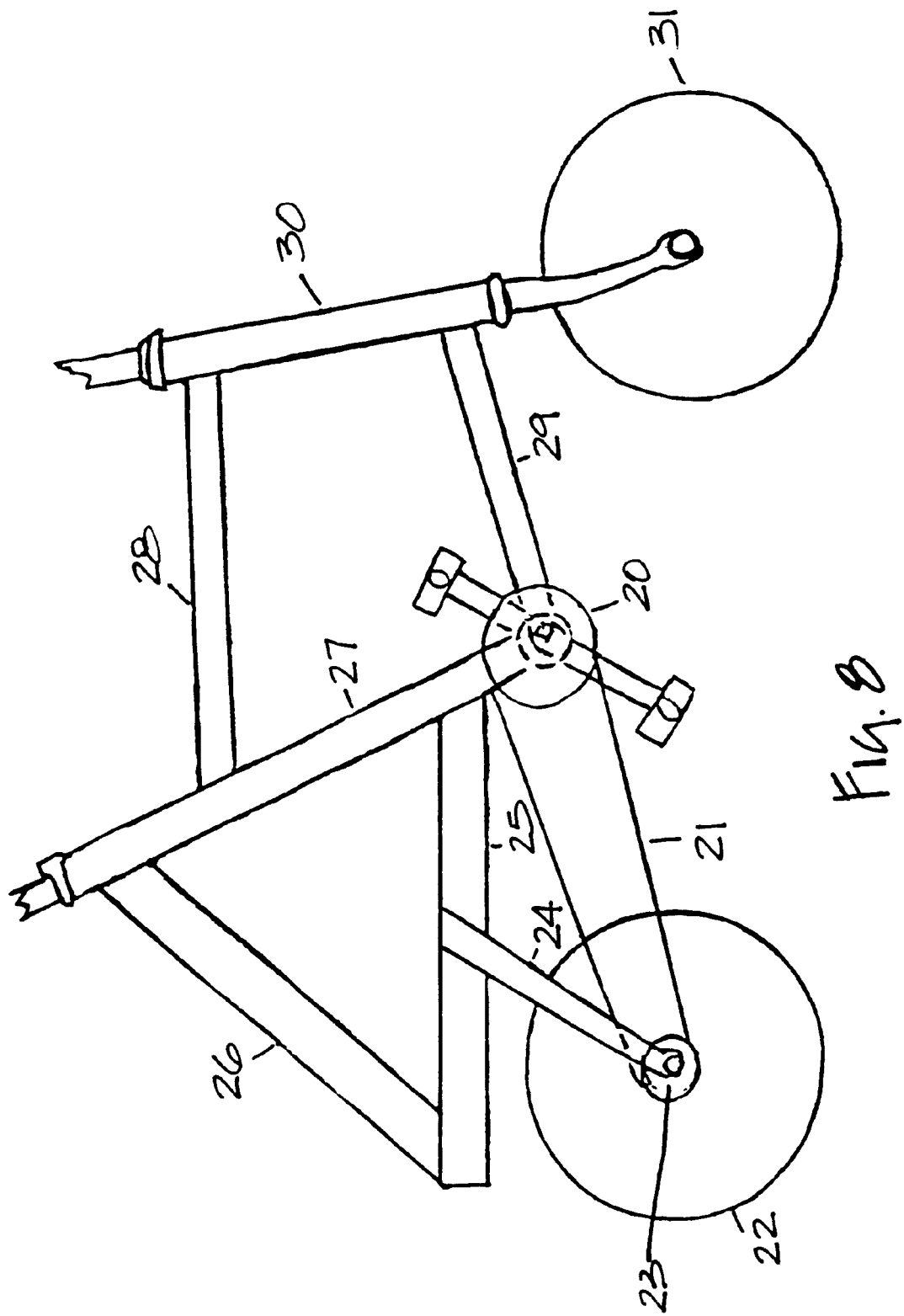
FIG. 8 is a side elevation of a type 1 bicycle using the improved frame.

FIG. 8 is a type 1 bicycle using the improved bicycle frame. It has a small size front wheel (31) and small size rear wheel (22). The chainwheel (20) is connected to the rear wheel gear (23) by a chain (21).

Figure 9:
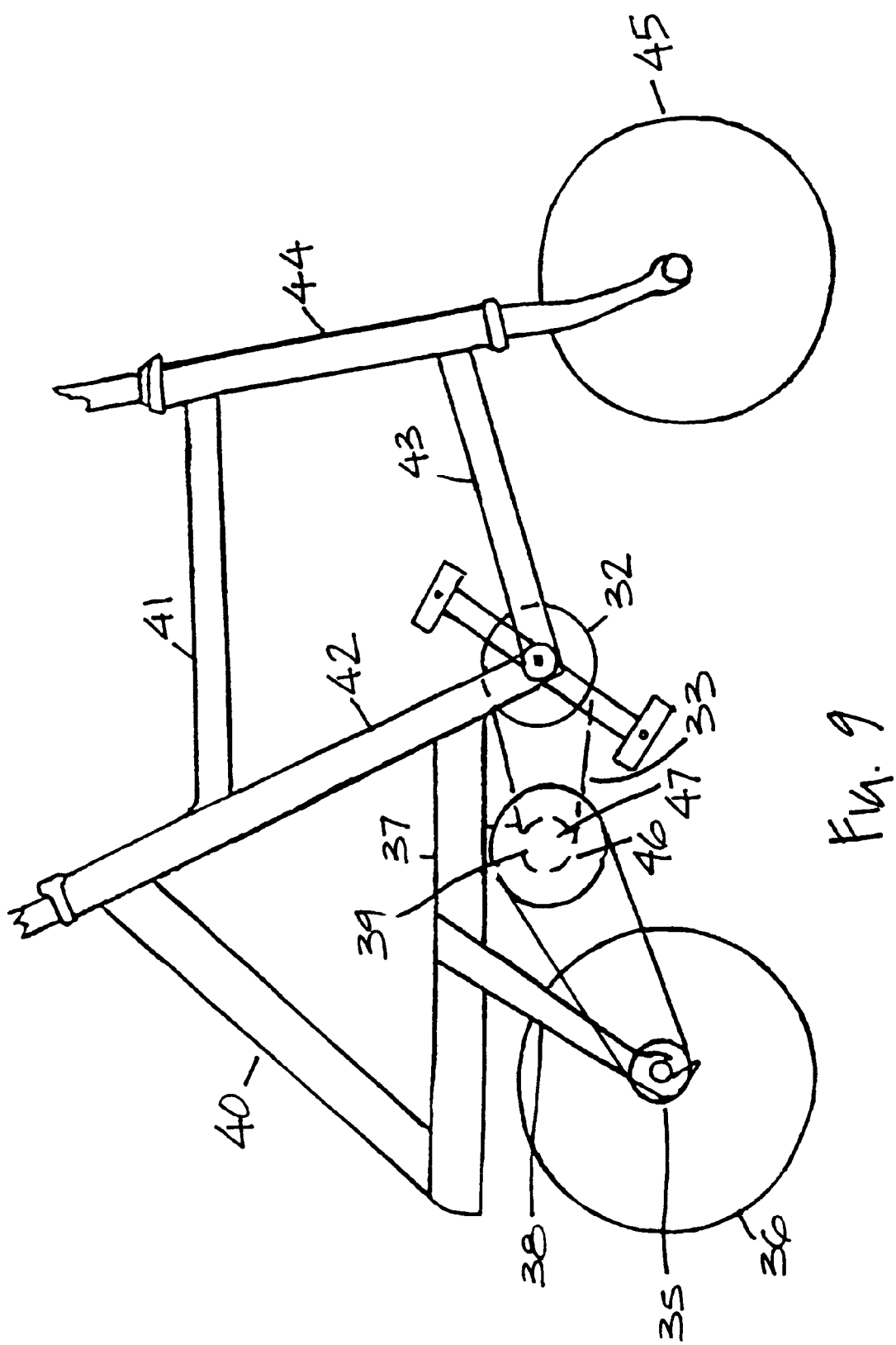
FIG. 9 is a side elevation of a type 2 bicycle using the improved bicycle frame.

FIG. 9 is a type 2 bicycle using the improved bicycle frame. It has a small size front wheel (45) and a small size rear wheel (36). A short oval tube (39) is attached at the underside of the chainstay (37) to which a bottom bracket shell is attached which houses a bottom bracket attached with a small gear (47) and a large gear (46). A first chain (33) connects the chainwheel (32) to the small gear (446). A second chain (34) connects the large gear (46),to the rear wheel gear (35).

Figure 10:
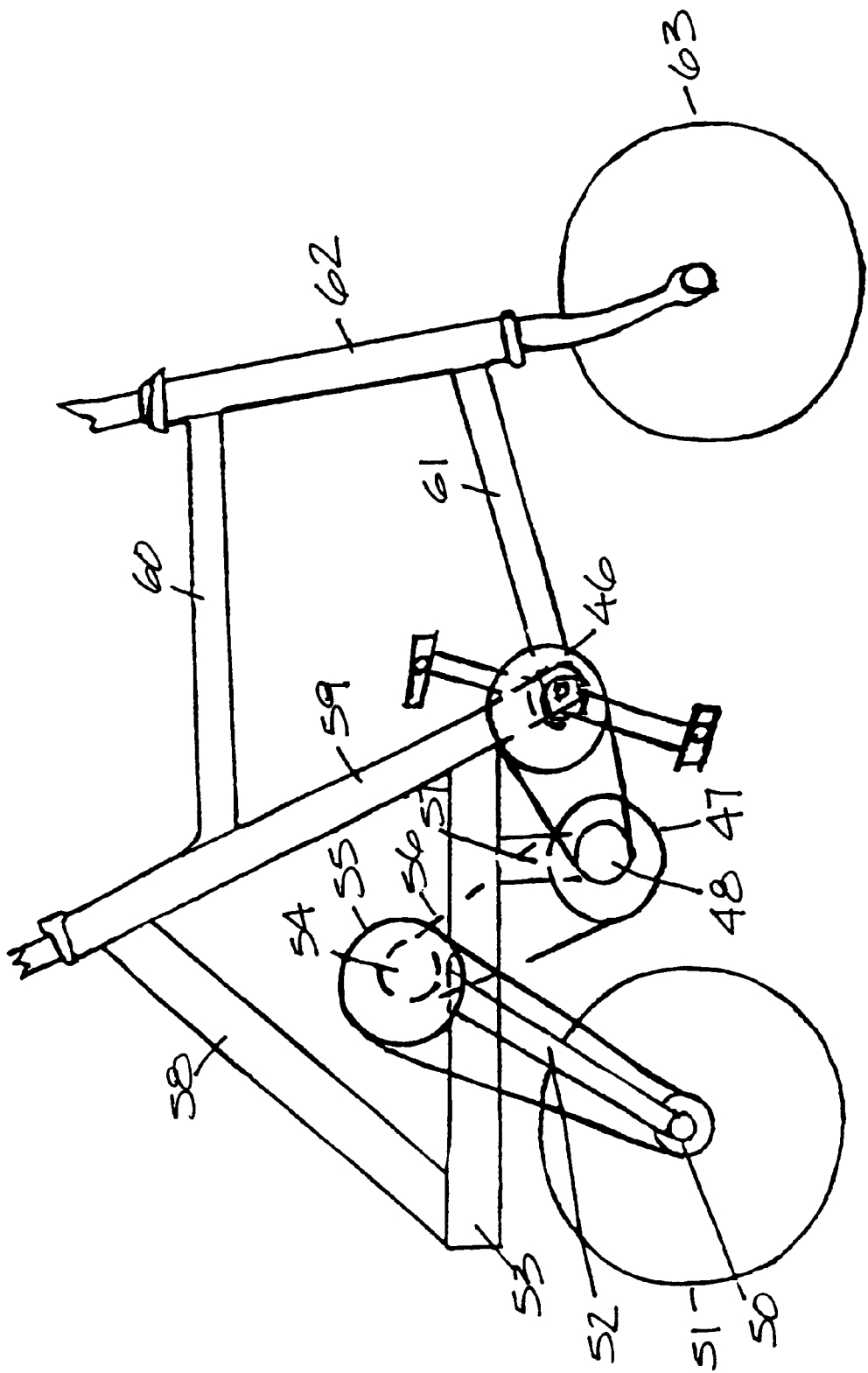
FIG. 10 is a side elevation of a type 3 bicycle using the improved frame.

FIG. 10 is a type 3 bicycle using the improved bicycle frame. It has a small size front wheel (63) and a small size rear wheel (51). A short oval tube (57) is attached at the underside of the chainstay (53) to which a bottom bracket shell is attached which houses a bottom bracket attached with a small gear (48) and a large gear (47). A second bottom bracket shell is attached at the top of the chainstay (53) which houses a bottom bracket attached with a small gear (54) and a large gear (55). A first chain (56) connects the chainwheel (46) to the first small gear (48). A second chain (56) connects the first large gear to the second small gear (54). A third chain (52) connects the second large gear (55) to the rear wheel gear (50).

Thus the reader will see that the improved bicycle frame is stronger, sturdier, and more stable.

While my above description contains many specifics, it only shows the preferred embodiments of my invention. Many other variations by those who are skilled in the art are possible.

Accordingly, the scope of the invention should be determined not by the embodiments illustrated, but by the appended claims and their legal equivalents.

I claim:

1. A bicycle frame having a front end and a back end, a neck tube, top tube, down tube, and a seat tube, said seat tube having an upper part and a lower part, said lower part having a bottom bracket shell, wherein the improvement comprises:

(a) a chain stay member having a first end and a second end, said first end attached to the back of the seat tube at the lower part or at the bottom bracket shell; and (b) a seat stay member having a first end and a second end, said first end of said seat stay member attached at the back of the seat tube at the upper part; and (c) means for rigidly connecting a first point on said chain stay member with a second point on said seat stay member, said first point located at or between said second end of said chain stay member and said first end of said chain stay member; and (d) at least one wheel fork attached to said chain stay member, a wheel mounted to an end of the fork, the wheel being entirely beneath said chain stay member.

2. The bicycle frame of claim 1, further comprising a bottom bracket shell attached beneath said chain stay member, and located ahead of said wheel fork.

3. The bicycle frame of claim 2, further comprising a second bottom bracket shell attached on said chain stay member, located between the first end and the second end of said chain stay member.

* * * * *